(12) United States Patent  
Gautam et al.

(10) Patent No.: US 9,128,587 B1  
(45) Date of Patent: Sep. 8, 2015

(54) SYSTEM, METHOD, AND COMPUTER PROGRAM FOR PRESENTING SERVICE OPTIONS TO A USER UTILIZING A THREE-DIMENSIONAL STRUCTURE

(75) Inventors: Amit Kr. Gautam, Jagadhari (IN); Ajay Kr. Gautam, Ambala, IN (US)

(73) Assignee: Amdocs Software Systems Limited, Dublin (IE)

( * ) Notice: Subject to any disclaimer, the term of this patent is extended or adjusted under 35 U.S.C. 154(b) by 1004 days.

(21) Appl. No.: 13/048,822

(22) Filed: Mar. 15, 2011

(51) Int. Cl.
  *G06F 3/0482* (2013.01)
  *G06F 3/0481* (2013.01)

(52) U.S. Cl.
  CPC ............ *G06F 3/0482* (2013.01); *G06F 3/0481* (2013.01)

(58) Field of Classification Search
  CPC ... G06F 3/0482; G06F 3/0481; G06F 3/0489; G06F 9/4443; H04N 5/44543
  USPC .......................................... 715/825; 345/419
  See application file for complete search history.

(56) References Cited

U.S. PATENT DOCUMENTS

| | | | | |
|---|---|---|---|---|
| 6,801,229 | B1 * | 10/2004 | Tinkler | 715/853 |
| 2002/0109680 | A1 * | 8/2002 | Orbanes et al. | 345/418 |
| 2009/0198607 | A1 * | 8/2009 | Badger et al. | 705/37 |
| 2010/0079462 | A1 | 4/2010 | Breeds et al. | |

* cited by examiner

*Primary Examiner* — Amy Ng  
*Assistant Examiner* — Roland Casillas  
(74) *Attorney, Agent, or Firm* — Zilka-Kotab, PC

(57) ABSTRACT

A system, method, and computer program product are provided for presenting service options to a user utilizing a three-dimensional structure. In use, a first group of service options are presented to a user, utilizing a three-dimensional structure. Additionally, a selection of one or more of the first group of service options by the user is received. Further, a selection of a depth element associated with the three-dimensional structure by the user is received. Further still, a second group of service options are presented to the user utilizing the three-dimensional structure, based on the selection of the one or more of the first group of service options and the selection of the depth element.

20 Claims, 6 Drawing Sheets

SYSTEM, METHOD, AND COMPUTER PROGRAM FOR PRESENTING SERVICE OPTIONS TO A USER UTILIZING A THREE-DIMENSIONAL STRUCTURE

FIELD OF THE INVENTION

The present invention relates to providing a plurality of services to a user, and more particularly to user navigation of the provided plurality of services.

BACKGROUND

Providing an enriched user experience has become an important factor driving application design. For example, an increasing amount of application users now demand improved navigational methods that provide an increased amount of information with a reduction in required user interaction. Unfortunately, conventional methods of organizing and navigating service options have exhibited various limitations.

For example, service catalogs may provide an entry point for sales and may be important for increasing a user base for a service provider. However, conventional service catalogs may organize service options in a sequential manner, which may require a user to move back and forth between various pages while navigating service options. More specifically, conventional service catalogs may utilize a plurality of links set up between a plurality of pages, which may require a user to move back and forth between the pages while navigating service options utilizing a browser or web site.

There is thus a need for addressing these and/or other issues associated with the prior art.

SUMMARY

A system, method, and computer program product are provided for presenting service options to a user utilizing a three-dimensional structure. In use, a first group of service options are presented to a user, utilizing a three-dimensional structure. Additionally, a selection of one or more of the first group of service options by the user is received. Further, a selection of a depth element associated with the three-dimensional structure by the user is received. Further still, a second group of service options are presented to the user utilizing the three-dimensional structure, based on the selection of the one or more of the first group of service options and the selection of the depth element.

DETAILED DESCRIPTION

Figure 1:
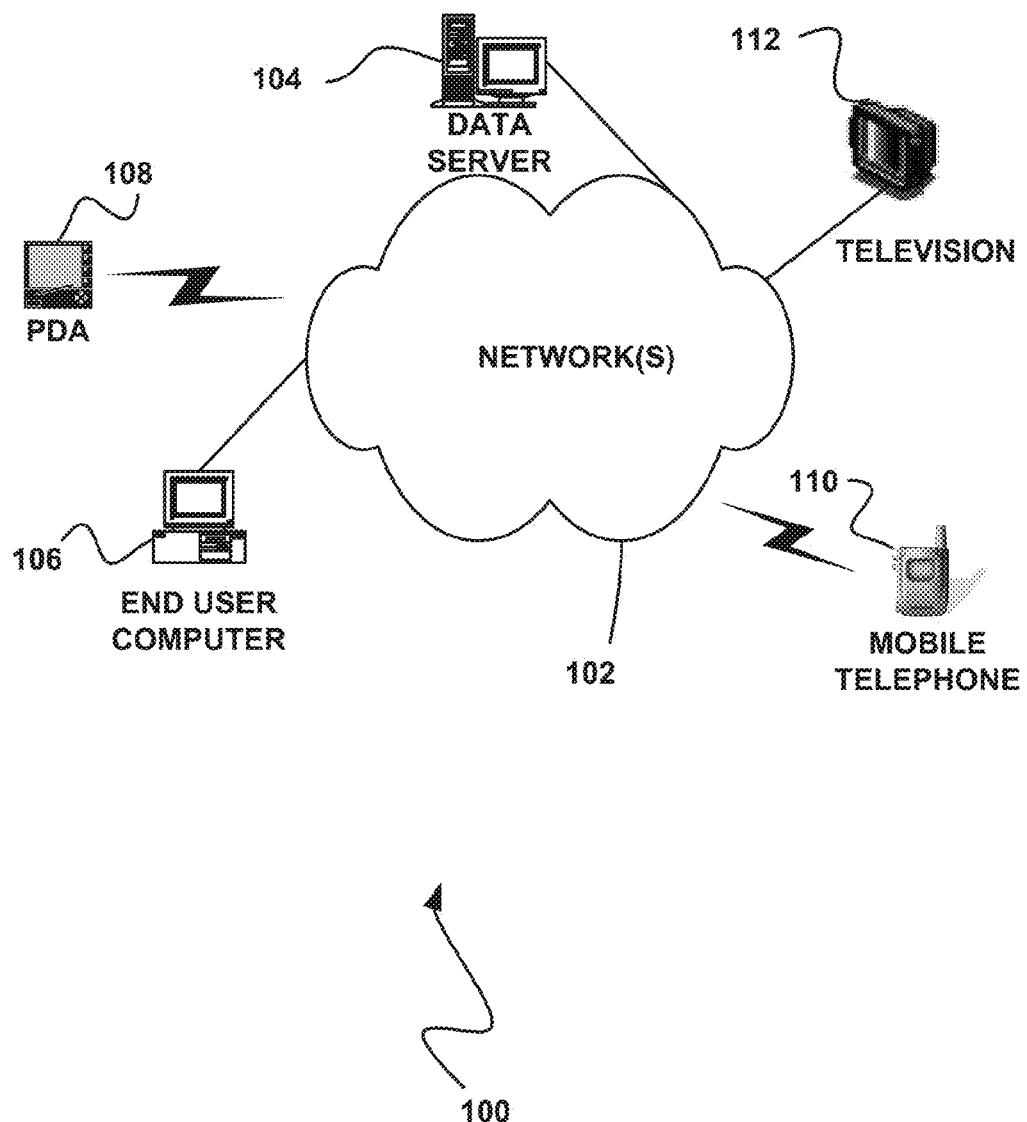
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
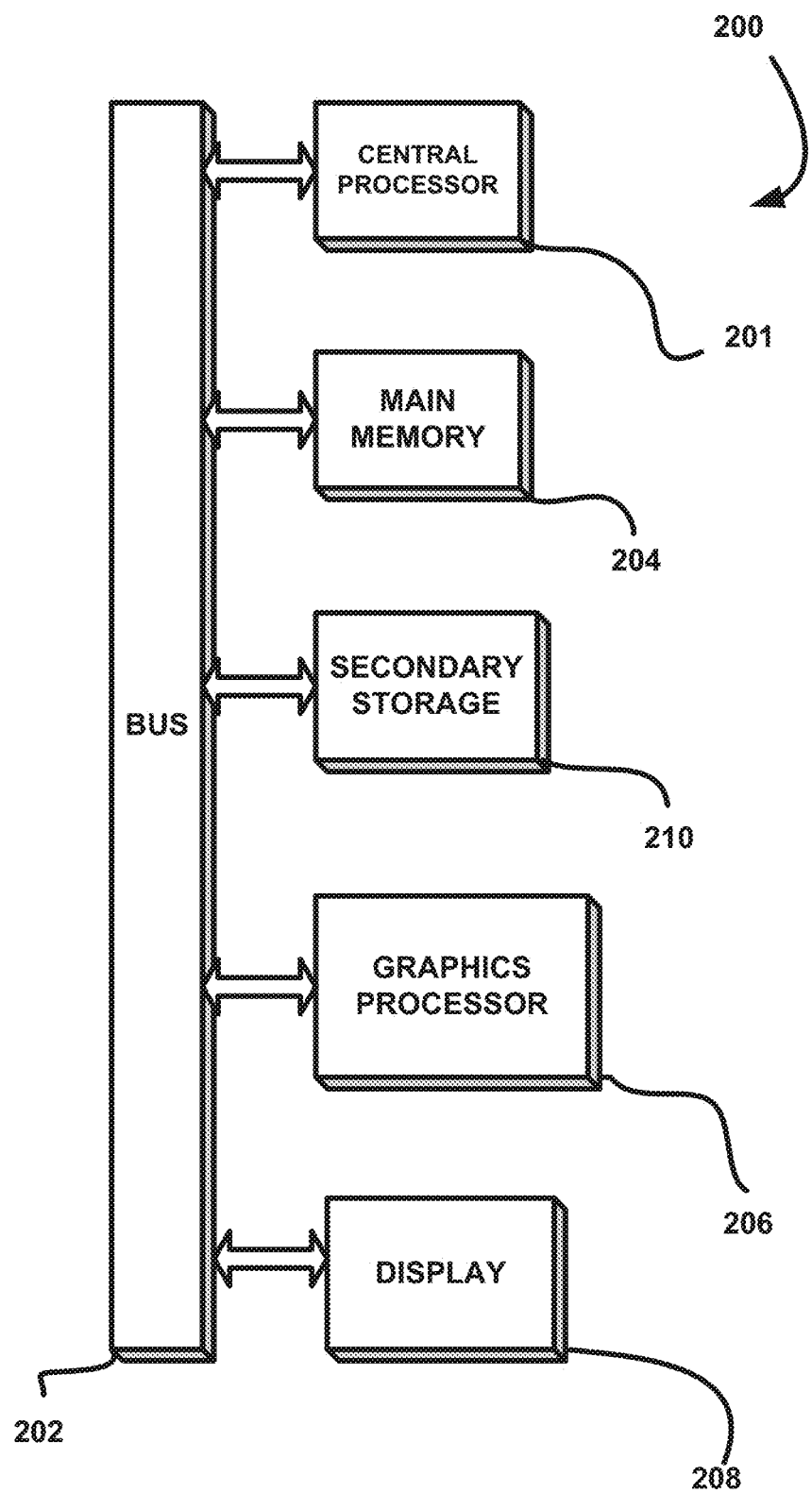
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 104) of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
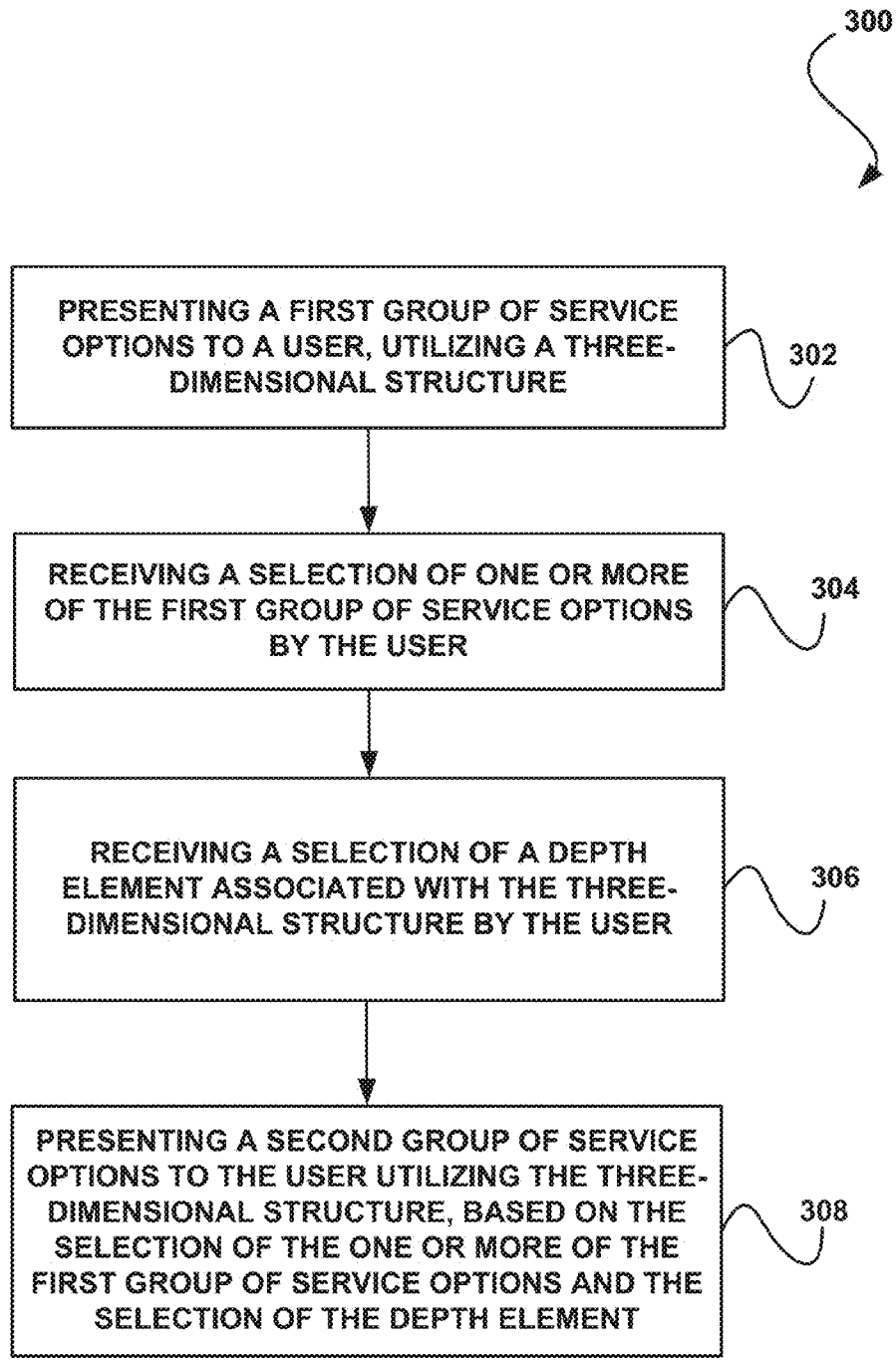
FIG. 3 illustrates a method for presenting service options to a user utilizing a three-dimensional structure, in accordance with one embodiment.

FIG. 3 illustrates a method 300 for presenting service options to a user utilizing a three-dimensional structure, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a first group of service options are presented to a user, utilizing a three-dimensional structure. In one embodiment, the service options may be associated with a system. For example, the system may include a business, corporation, or any other type of organization. In another example, the service options may be associated with one or more services provided by the system.

Additionally, in one embodiment, the user may include a customer of the system. For example, the user may include a customer interested in purchasing a product or service provided by the system, utilizing the service options. In another embodiment, the user may include an employee of the system. For example, the user may include an administrator, manager, or associated of the system interested in adjusting one or more options of the system, utilizing the service options.

Further, in one embodiment, the service options may include one or more of services and sub-services available to the user. For example, the service options may include a network service type, a network service bandwidth, an amount of data storage space, etc. In another embodiment, the service options may include one or more of a product or a portion of a product available to the user. For example, the service options may include a particular mobile device, a specific feature or features of the mobile device, etc.

In yet another embodiment, the service options may include one or more business options associated with the user. For example, the service options may include benefits associated with an employee, new employee qualifications, employee salary, etc. Further still, in one embodiment, the service options may be included within a service catalog. For example, the service catalog may include an itemized list of services and sub-services being provided to the user. Additionally, the user may navigate through this list to model a service of choice based on one or more parameters associated with the services and sub services. In another embodiment, the list may be arranged as a set of sequential selections.

Also, in another embodiment, the three-dimensional structure may include an interface with three dimensions. For example, the three-dimensional structure may include an interface with an x, y, and z, axis. In another example, the three-dimensional structure may include an interface with a length element, a width element, and a depth element. In yet another embodiment, the three-dimensional structure may include a horizontal plane. For example, the three-dimensional structure may include a horizontal plane that is accessible utilizing a pointer/mouse/cursor selection of the user.

In still another embodiment, the first group of service options may be displayed to the user on the horizontal plane of the three-dimensional structure. Additionally, in one embodiment, the three-dimensional structure may include a depth element associated with the horizontal plane. For example, the three-dimensional structure may include a depth element that is accessible utilizing an adjustable display (e.g., a sliding bar such as a "depth traverser" allowing a user to change the depth element, etc.).

Further, as shown in operation 304, a selection of one or more of the first group of service options by the user is received. In one embodiment, the selection of one or more of the first group of the service options may be made within the horizontal plane of the three-dimensional structure by the user utilizing a cursor controlled by the user. Of course, however, the selection of one or more of the first group of service options may be performed by the user in any manner. In another embodiment, the selection may be received at the system associated with the service options.

Further still, as shown in operation 306, a selection of a depth element associated with the three-dimensional structure by the user is received. In one embodiment, the selection of the depth element associated with the three-dimensional structure may be made by the user utilizing the adjustable display associated with the depth element of the three-dimensional structure. For example, the user may select a particular depth within the three-dimensional structure other than the currently displayed depth.

In another embodiment, the depth element selected by the user may include an indication that the user desires to view a group of service options at a particular level of detail. For example, the depth element selected by the user may include an indication that the user desires to view a group of service options that is more detailed than the first group of options. In another example, the depth element selected by the user may include an indication that the user desires to view a group of service options that is less detailed than the first group of options.

Also, as shown in operation 308, a second group of service options are presented to the user utilizing the three-dimensional structure, based on the selection of the one or more of the first group of service options and the selection of the depth element. In one embodiment, the second group of service options may provide additional detail regarding the selected service options of the first group of options.

For example, the first group of service options may include a plurality of core services, and the second group of service options may include additional options associated with each of the selected plurality of core services. In another embodiment, the second group of service options may provide additional detail regarding the selected service options of the first group of options if the depth element selected by the user indicates that the user desires to view a group of service options that is more detailed than the first group of options.

Additionally, in one embodiment, the second group of service options may provide less detail regarding the selected service options of the first group of options. For example, the first group of service options may include a payment options associated with one or more core services, and the second group of service options may include a more general selection of the core services. In still another embodiment, the second group of service options may provide less detail regarding the selected service options of the first group of options if the depth element selected by the user indicates that the user desires to view a group of service options that is less detailed than the first group of options.

Additionally, in one embodiment, the service options may be stored within a data structure. For example, the service options may be stored within a tree data structure. In another embodiment, each group of service options may represent a node level of the tree data structure. In yet another embodiment, each node level of the tree data structure may be presented on a horizontal plane of the three-dimensional structure. Further, in one embodiment, both the first group of service options as well as the second group of service options may be displayed to the user on a single screen.

In this way, a depth dimension may be visually added to the navigation and selection of service options by the user, thereby providing a more intuitive and efficient user experience. Additionally user error associated with service option selection may be reduced.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
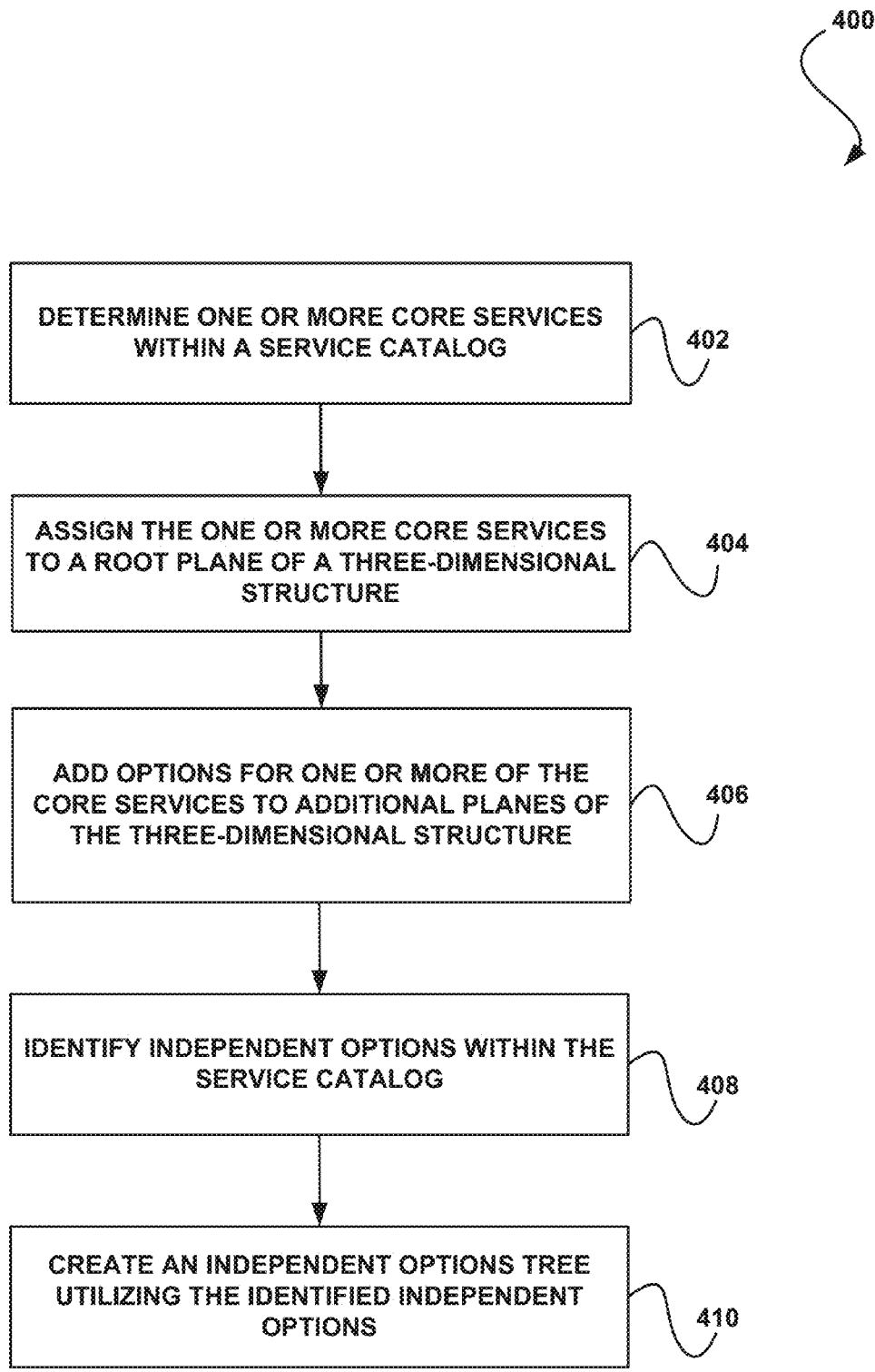
FIG. 4 illustrates a method for organizing service parameters of a service catalog within a three-dimensional structure, in accordance with another embodiment.

FIG. 4 illustrates an exemplary method 400 for organizing service parameters of a service catalog within a three-dimensional structure, in accordance with another embodiment. As an option, the method 400 may be implemented in the context of the details of FIGS. 1-3. Of course, however, the method 400 may be implemented in any desired environment. Further, the aforementioned definitions may equally apply to the description below.

As shown in operation 402, one or more core services are determined within a service catalog. In one embodiment, the core services may include the main services provided within the service catalog (e.g., general communications services, general employment services, main catalog products, etc.). In another embodiment, the core services may be mutually exclusive. For example, only one core service may be selected by a user at a time. In yet another embodiment, the core services may be selectable by the user along with other core services.

Additionally, as shown in operation 404, the one or more core services are assigned to a root plane of a three-dimensional structure. For example, the three-dimensional structure may include a tree structural format, where each node of the tree is represented by a plane of the three-dimensional structure. Additionally, the one or more core services may be stored in a root node (e.g., the topmost node, etc.) of the tree structural format, and may therefore be displayed within the root plane of the three-dimensional structure associated with the root node of the tree. In this way, the root plane of the three-dimensional structure may provide a high level of detail of services available to the user.

Further, as shown in operation 406, options for one or more of the core services are added to additional planes of the three-dimensional structure. For example, the tree structural format may include a plurality of node levels below the root node. Additionally, each node level of the tree structural format may be represented by a plane of the three-dimensional structure.

In one embodiment, the root plane may represent the first level of the three-dimensional structure, a second plane may represent a second, more detailed level of the three-dimensional structure, a third plane may represent a third, even more detailed level of the three-dimensional structure, etc. In another embodiment, the tree structure may initially diverge but may later converge (e.g., in later planes, etc.).

Further still, as shown in operation 408, independent options are identified within the service catalog. In one embodiment, the independent options may include any options available within the service catalog that are not directly associated with the one or more core services. Also, as shown in operation 410, an independent options tree is created utilizing the identified independent options.

In one embodiment, the independent options tree may include all independent options that have been identified. In another embodiment, the independent options tree may be separate from the tree structural format of the three-dimensional structure. In this way, the independent options may be displayed within the three-dimensional structure at any point during the service selection process.

Figure 5:
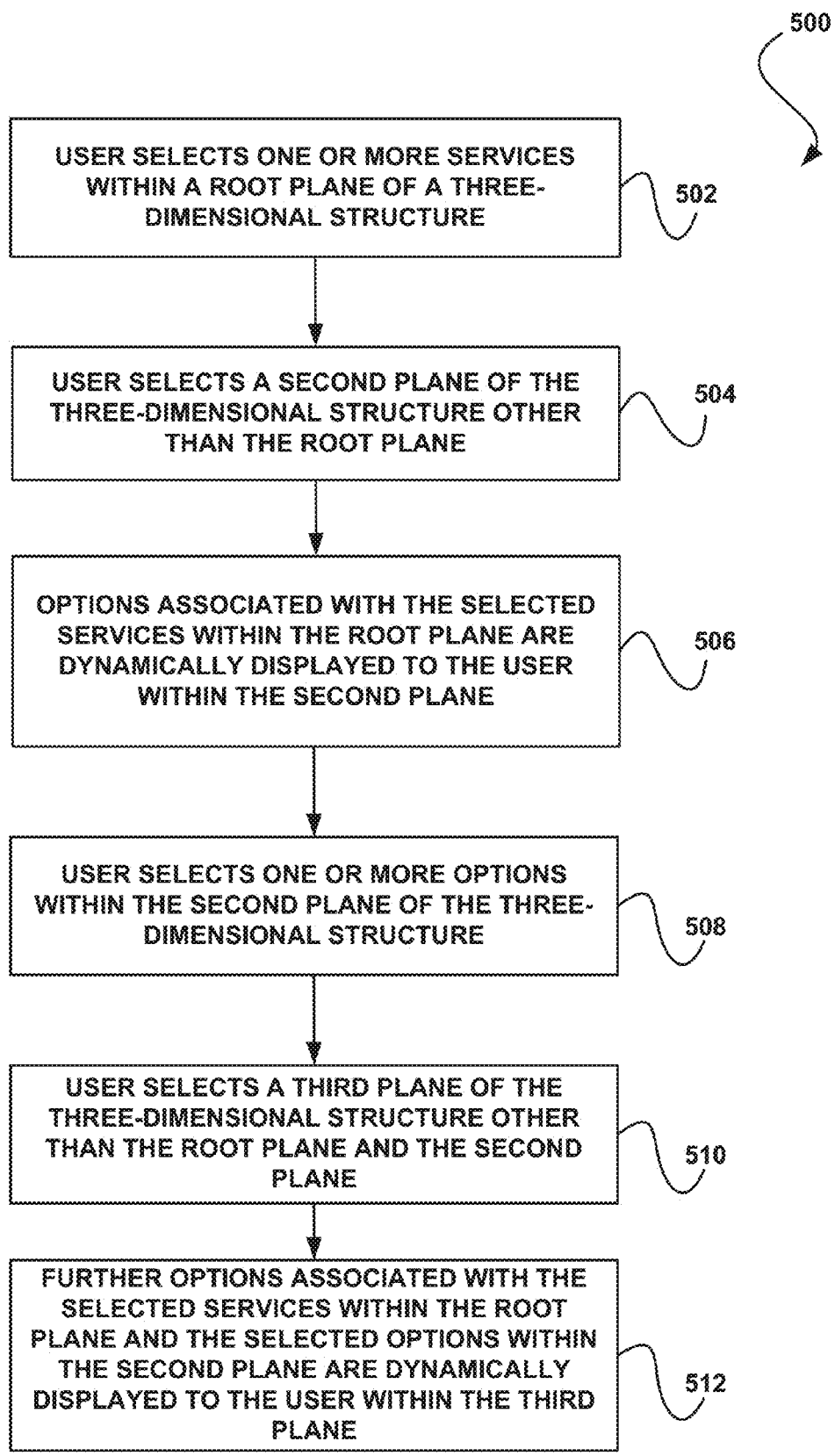
FIG. 5 illustrates a method for defining a service within a service catalog utilizing a three-dimensional structure, in accordance with another embodiment.

FIG. 5 illustrates an exemplary method 500 for defining a service within a service catalog utilizing a three-dimensional structure, in accordance with another embodiment. As an option, the method 500 may be implemented in the context of the details of FIGS. 1-4. Of course, however, the method 500 may be implemented in any desired environment. Further, the aforementioned definitions may equally apply to the description below.

As shown in operation 502, a user selects one or more services within a root plane of a three-dimensional structure. For example, the root plane may be displayed to the user within an interface (e.g., a graphical user interface (GUI), etc.), and the user may select the one or more services by clicking on one or more of the services with an icon, or by any other selection technique.

Additionally, as shown in operation 504, the user selects a second plane of the three-dimensional structure other than the root plane. For example, the user may select a plane including options associated with the services within the root plane. In one embodiment, the user may select the second plane utilizing a sliding bar associated with the depth of the three-dimensional structure.

Further, as shown in operation 506, options associated with the selected services within the root plane are dynamically displayed to the user within the second plane. In one embodiment, once the one or more services have been selected within the root plane, only options associated with those services may remain enabled within the three-dimensional structure. In another embodiment, these options may be represented by a corresponding tree, where each node level of the tree is represented as a separate plane accessible to the user using the sliding bar associated with the depth of the three-dimensional structure.

In yet another embodiment, one or more options that are dynamically displayed to the user may be marked as recommended to the user. For example, an entity (e.g., a service provider, an administrator, etc.) may define a recommended option set for each plane displayed to the user. In another embodiment, the entity may define the recommended option set for each depth level up to a predetermined depth level, beyond which the recommended options may be associated with a service being defined and may be dynamically determined by the service definition.

In still another embodiment, one or more independent options may be presented to the user. For example, the independent options may be displayed to the user within the interface (e.g., adjacent to the three-dimensional structure, within the three-dimensional structure, etc.). In this way, the one or more independent options may be selected at any point within the service definition process in an intuitive manner.

Further still, as shown in operation 508, the user selects one or more options within the second plane of the three-dimensional structure. Also, as shown in operation 510, the user selects a third plane of the three-dimensional structure other than the root plane and the second plane. Additionally, as shown in operation 512, further options associated with the selected services within the root plane and the selected options within the second plane are dynamically displayed to the user within the third plane. In this way, at each depth level of the three-dimensional structure, the user may select desired options, and the three-dimensional structure may then dynamically manage the enabling and disabling of valid additional options associated with the selected options.

In one embodiment, each service within the service catalog may be defined by the set of options selected by the user. In another embodiment, if two sets have different options then it may be implied that the services are different as well. Additionally, in another embodiment, options that define a service may be structured as a tree, where the available choices may be dependent on previous selections made by the user. In yet another embodiment, options that define the service may be available independently and may be added at any point in time during the selection process.

Further, in one embodiment, for complex services, amongst the set of available options for the service, many of the options may be dependent options. In another embodiment, the dependent options may form a stack structure with each lower plate refining or expanding the selection. Further still, in one embodiment, complex service modeling may require the modeler to communicate to various sources (e.g., internal sources, external sources, etc.) in order to retrieve required information about various service options. Additionally, each of the various sources may respond at varying intervals, such that two different users may have different sets of information at any given point. In this way, the user may configure the service selection process as per their view of service modeling in a dynamic manner.

Figure 6:
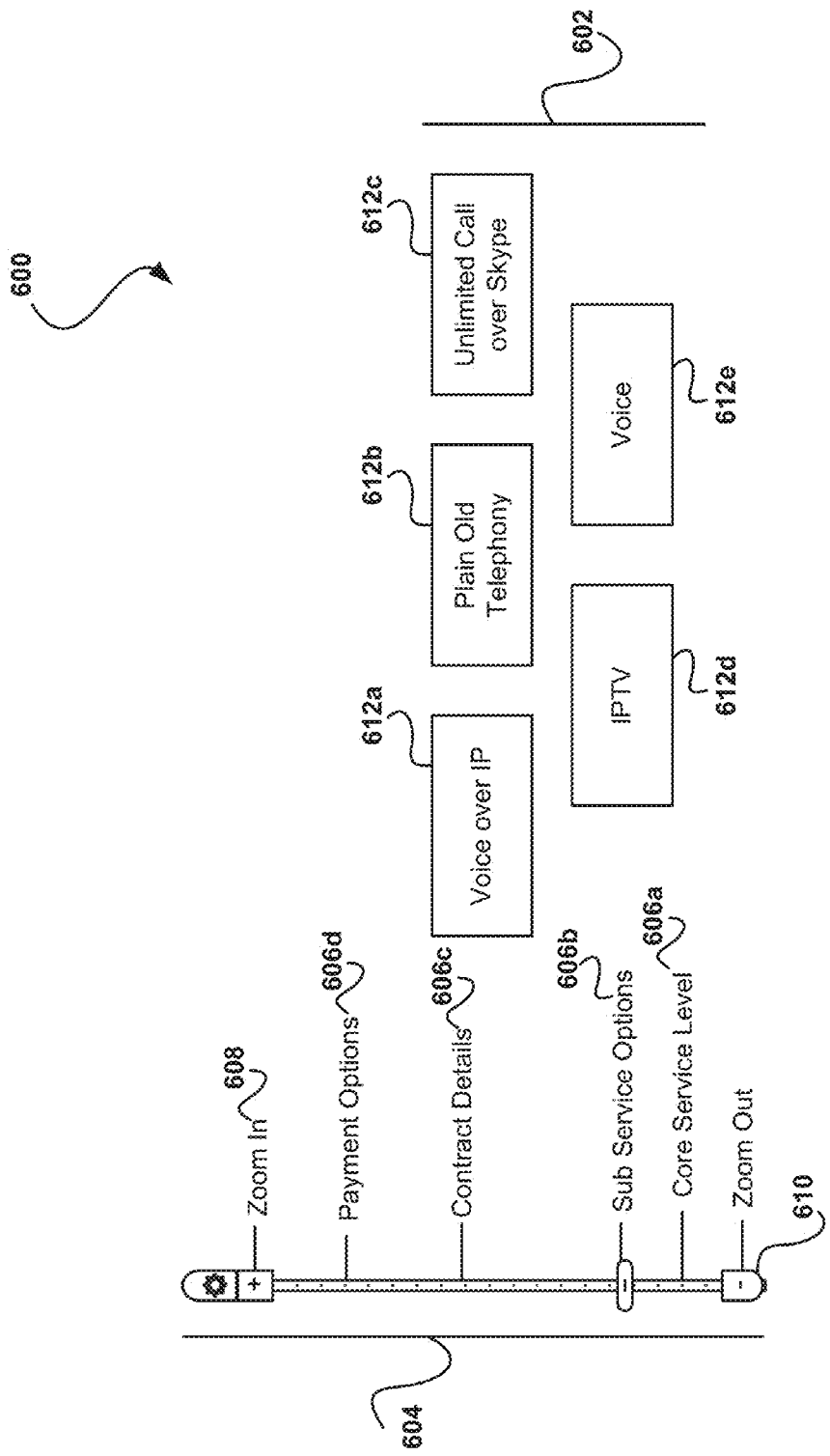
FIG. 6 illustrates an exemplary three-dimensional service catalog structure, in accordance with another embodiment.

FIG. 6 illustrates an exemplary three-dimensional service catalog structure 600, in accordance with another embodiment. As an option, the structure 600 may be implemented in the context of the details of FIGS. 1-5. Of course, however, the structure 600 may be implemented in any desired environment. Further, the aforementioned definitions may equally apply to the description below.

As shown, a current plane 602 of the structure 600 is displayed adjacent to a depth traverser 604 used to navigate between the different depth levels 606a-d of the structure 600. Additionally, the depth traverser 604 includes a zoom in button 608 and a zoom out button 610. In one embodiment, a user may click on the zoom in button 608 or the zoom out button 610 in order to navigate to one of the different depth levels 606a-d of the structure 600.

More specifically, in one example, selecting the core service level depth level 606a may display a plane showing core services of the service catalog, where such plane may replace the current plane 602 within the structure 600. Additionally, in another example, selecting the payment options depth level 606d may display a plane showing financing options of services within the service catalog, where such plane may replace the current plane 602 within the structure 600.

Additionally, in one example, the user may view the current plane 602 associated with the sub service options depth level 606b, hut may subsequently click on the zoom in button 608 in order to view another plane associated with the contract details depth level 606c. In yet another example, the user may view the current plane 602 associated with the sub service options depth level 606b, but may subsequently click on the zoom out button 610 in order to view another plane associated with the core service level depth level 606a.

In another embodiment, the user may directly select one of the different depth levels 606a-d of the structure 600 in order to view the plane associated with the selected depth level. In this way, the user may navigate to any plane without having to click sequentially to reach a desired web page. Additionally, in one embodiment, each of the different depth levels 606a-d of the structure 600 may be mapped to a specific aspect of a service provided within the service catalog.

In this way, the user may have an intuitive view of overall service options and may not need to remember how much back or forward movement is required to reach a specific service aspect within the structure 600. Additionally, having the different depth levels 606a-d as well as the current plane 602 present to the user on a single screen may have a physiological impact of making the user feel that the service modeling process is simpler than a similar process conveyed to the user using multiple pages.

Further, in one embodiment, one or more recommended options may be presented to the user at each of the different depth levels 606a-d of the structure 600. For example, if the user selects one or more sub service option parameters on the current plane 602 and subsequently selects depth level 606a, 606c, or 606d within the depth traverser 604, the plane associated with the selected depth level may only display parameters based on the parameters selected within the current plane 602.

Further still, in one embodiment, the one or more recommended options may include recommended values set by a designer of the structure 600, an administrator, or any other entity. In this way, the recommended options may assist the user in setting up service options at any depth. In yet another embodiment, the user may at any point in time traverse to any plane in the structure 600 and may change already set recommended values to one or more other values. In this way, the modeling of one or more services may be performed dynamically without necessitating a definitive selection path and may accommodate a situation where selecting service options requires inputs from various additional resources which may respond during unpredictable time intervals.

Also, in another embodiment, a user may be provided one or more cumulative estimates while navigating each plane of the structure 600. For example, while navigating services 612a-e, if the user hovers over the telephony service 612b of the current plane 602, they may be presented with minimum and maximum monthly charges to be paid for the telephony service 612b. In another example, if the user hovers over the IPTV service 612d of the current plane 602, they may be presented with minimum and maximum monthly charges to be paid for the IPTV service 612b.

In this way, the user may be provided estimates of charges for each service within the current plane 602 by merely pointing to them (e.g., with a mouse pointer, icon, etc.), such that the user can decide at the onset which branch to follow within the structure 600. Also, the user may avoid having to return to a previous window or page to change a selection modeling a service in order to see an updated estimate for the chosen service, thereby providing the user more information in a more intuitive manner while requiring less action from the user.

Additionally, in one embodiment, all user actions may take place on a single screen utilizing the structure 600. For example, each of the planes displayed within the structure 600 may be identified by three parameters (e.g., parent, depth, position relative to other nodes with same parent and depth, etc.). Additionally, during run time, the depth traverser 604 may parse a tree structure created in memory and may present the planes accordingly.

In this way, designers may design the flow of the structure 600 and developers may create planes individually without having to link them with each other, thereby separating link management from the actual web page design, enabling faster development with fewer errors, providing a consistent look and feel across all of the displayed planes, and allowing for a unified and intuitive representation of data.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
    presenting by a system a first group of service options to a user within a first plane having a first depth within a three-dimensional interface, where the service options and depth are stored within a predetermined data structure of the system;
    receiving by the system a selection of one or more service options of the first group of service options by the user;
    receiving by the system from the user a selection of a second plane having a second depth within the three-dimensional interface that is greater or less than the first depth, where the second plane is associated with a second group of service options;
    identifying by the system a third group of service options that is smaller than the second group of service options and that is selected from the second group of service options based on the selected one or more service options;
    presenting by the system only the third group of service options to the user within the second plane having the second depth within the three-dimensional interface;

comparing by the system the second depth to a predetermined depth;

marking and displaying by the system one or more of the presented third group of service options as recommended to the user, where:

the one or more marked service options are predetermined by an administrator when it is determined that the second depth does not exceed the predetermined depth, and the one or more marked service options are dynamically determined by the system based on the presented third group of service options when it is determined that the second depth exceeds the predetermined depth;

identifying by the system that the user is hovering a cursor over one of the third group of service options within the second plane; and presenting by the system to the user a minimum and a maximum monthly charge associated with the one of the third group of service options over which the cursor of the user is hovered, where the minimum and a maximum monthly charge are calculated using the selection by the user of one or more service options of the first group of service options.

2. The computer program of claim 1, wherein the service options include one or more of services and sub-services available to the user.

3. The computer program of claim 1, wherein the service options are included within a service catalog.

4. The computer program of claim 3, wherein the computer program product is operable such that the service catalog includes an itemized list of services and sub-services being provided to the user.

5. The computer program of claim 1, wherein both the first group of service options as well as the third group of service options are displayed to the user on a single screen.

6. The computer program of claim 1, wherein the three-dimensional interface includes an interface with a length element, a width element, and a depth element.

7. The computer program of claim 1, wherein the three-dimensional interface includes a horizontal plane that is accessible utilizing the cursor selection of the user.

8. The computer program of claim 7, wherein the first group of service options are displayed to the user on the horizontal plane of the three-dimensional interface.

9. The computer program of claim 8, wherein the selection of one or more of the first group of the service options is made within the horizontal plane of the three-dimensional interface by the user utilizing the cursor controlled by the user.

10. The computer program of claim 1, wherein the selection of the second plane having the second depth is made by the user utilizing an adjustable display associated with the depth element of the three-dimensional interface.

11. The computer program of claim 1, wherein the second depth is associated with a particular level of detail.

12. The computer program of claim 1, wherein the third group of service options provide additional detail regarding the selected service options of the first group of options.

13. The computer program of claim 12, wherein the third group of service options provides additional detail regarding the selected service options of the first group of options if the second depth is greater than the first depth.

14. The computer program of claim 1, wherein the third group of service options provides less detail regarding the selected service options of the first group of options.

15. The computer program of claim 14, wherein the third group of service options provides less detail regarding the selected service options of the first group of options if the second depth is less than the first depth.

16. The computer program of claim 1, wherein each group of service options represents a node level of a tree data structure.

17. The computer program of claim 16, wherein each node level of the tree data structure is presented on a horizontal plane of the three-dimensional interface.

18. A method, comprising:

presenting by a system a first group of service options to a user within a first plane having a first depth within a three-dimensional interface, where the service options and depth are stored within a predetermined data structure of the system;

receiving by the system a selection of one or more service options of the first group of service options by the user;

receiving by the system from the user a selection of a second plane having a second depth within the three-dimensional interface that is greater or less than the first depth, where the second plane is associated with a second group of service options;

identifying by the system a third group of service options that is smaller than the second group of service options and that is selected from the second group of service options based on the selected one or more service options;

presenting by the system only the third group of service options to the user within the second plane having the second depth within the three-dimensional interface;

comparing by the system the second depth to a predetermined depth;

marking and displaying by the system one or more of the presented third group of service options as recommended to the user, where:

the one or more marked service options are predetermined by an administrator when it is determined that the second depth does not exceed the predetermined depth, and the one or more marked service options are dynamically determined by the system based on the presented third group of service options when it is determined that the second depth exceeds the predetermined depth;

identifying by the system that the user is hovering a cursor over one of the third group of service options within the second plane; and presenting by the system to the user a minimum and a maximum monthly charge associated with the one of the third group of service options over which the cursor of the user is hovered, where the minimum and a maximum monthly charge are calculated using the selection by the user of one or more service options of the first group of service options.

19. A system, comprising a processor for performing a method, the method comprising:

presenting by a system a first group of service options to a user within a first plane having a first depth within a three-dimensional interface, where the service options and depth are stored within a predetermined data structure of the system;

receiving by the system a selection of one or more service options of the first group of service options by the user;

receiving by the system from the user a selection of a second plane having a second depth within the three-dimensional interface that is greater or less than the first depth, where the second plane is associated with a second group of service options;

identifying by the system a third group of service options that is smaller than the second group of service options and that is selected from the second group of service options based on the selected one or more service options;

presenting by the system only the third group of service options to the user within the second plane having the second depth within the three-dimensional interface;

comparing by the system the second depth to a predetermined depth;

marking and displaying by the system one or more of the presented third group of service options as recommended to the user, where:

the one or more marked service options are predetermined by an administrator when it is determined that the second depth does not exceed the predetermined depth, and the one or more marked service options are dynamically determined by the system based on the presented third group of service options when it is determined that the second depth exceeds the predetermined depth;

identifying by the system that the user is hovering a cursor over one of the third group of service options within the second plane; and presenting by the system to the user a minimum and a maximum monthly charge associated with the one of the third group of service options over which the cursor of the user is hovered, where the minimum and a maximum monthly charge are calculated using the selection by the user of one or more service options of the first group of service options.

20. The system of claim 19, wherein the processor is coupled to memory via a bus.

\* \* \* \* \*